United States Patent [19]

Emery et al.

[11] Patent Number: 4,542,829

[45] Date of Patent: Sep. 24, 1985

[54] APPARATUS FOR SORTING SHEETS ACCORDING TO THEIR PATTERNS

[75] Inventors: Stephen G. Emery; Rick J. Humble, both of Hampshire, England

[73] Assignee: De La Rue Systems Limited, London, England

[21] Appl. No.: 438,710

[22] Filed: Nov. 2, 1982

[30] Foreign Application Priority Data

Nov. 3, 1981 [GB] United Kingdom ................. 8133154

[51] Int. Cl.[4] ........................ B07C 5/342; G06K 9/00

[52] U.S. Cl. ...................................... 209/534; 356/71; 356/394; 382/7

[58] Field of Search ....................... 209/534, 587, 588; 356/71, 394; 382/7, 50

[56] References Cited

U.S. PATENT DOCUMENTS

| | | | |
|---|---|---|---|
| 3,360,653 | 12/1967 | Phares | 209/534 X |
| 3,496,371 | 2/1970 | Endo | 382/7 X |
| 3,872,434 | 3/1975 | Duvall et al. | 382/50 |
| 3,930,581 | 1/1976 | Gray | 209/534 |
| 4,131,879 | 12/1978 | Ehrat | 209/534 X |
| 4,179,685 | 12/1979 | O'Maley | 209/534 X |
| 4,186,378 | 1/1980 | Moulton . | |
| 4,288,781 | 9/1981 | Sellner et al. | 209/534 X |
| 4,298,807 | 11/1981 | Favre | 356/71 X |
| 4,348,656 | 9/1982 | Gorgone et al. | 209/534 X |

FOREIGN PATENT DOCUMENTS

| | | | |
|---|---|---|---|
| 2127767 | 10/1972 | France . | |
| 53-29619 | 3/1978 | Japan | 382/7 |
| 288327 | 7/1929 | United Kingdom . | |
| 0894570 | 4/1962 | United Kingdom . | |
| 0906296 | 9/1962 | United Kingdom . | |
| 1006995 | 10/1965 | United Kingdom . | |
| 1143585 | 2/1969 | United Kingdom . | |
| 1201349 | 8/1970 | United Kingdom . | |
| 1475116 | 6/1977 | United Kingdom . | |
| 1584096 | 2/1981 | United Kingdom . | |
| 2062854 | 5/1981 | United Kingdom | 534/ |

*Primary Examiner*—Robert B. Reeves
*Assistant Examiner*—Edward M. Wacyra
*Attorney, Agent, or Firm*—Cushman, Darby & Cushman

[57] ABSTRACT

Apparatus for sorting banknotes in accordance with the printed patterns on their surfaces comprises: an illumination source (S) for illuminating the banknote; a scanning device (1), for example an array of photodetectors, for collecting light from a plurality of illuminated pixels of the pattern; a moving device for moving the banknote relative to the scanning device; and an analogue-to-digital converter (6) responsive to signals from the scanning device representative of the intensity of light from each pixel, to produce intensity signals in digital form; a digital memory (7) for storing the digital signals; digital correlator device (8, 10) for correlating the stored signals with a previously-stored set of signals representative of a set of standard patterns, the correlation being performed pixel by pixel; and a sorting device, responsive to the result of the correlation to divert the banknote in accordance with the most likely match.

4 Claims, 2 Drawing Figures

APPARATUS FOR SORTING SHEETS ACCORDING TO THEIR PATTERNS

Figure 1:
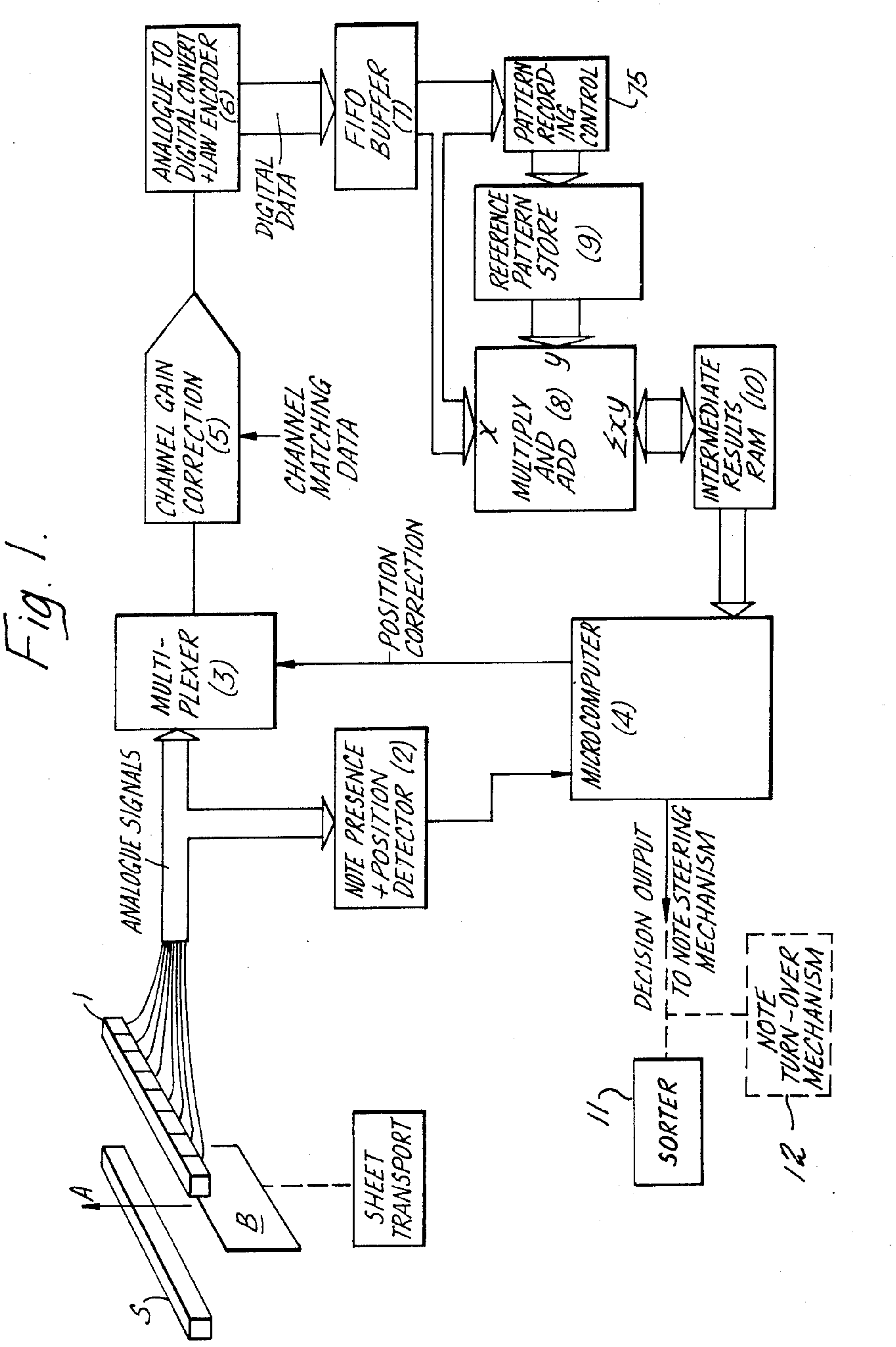

This invention relates to a method and apparatus for sorting sheets such as documents and banknotes in accordance with their patterns. The apparatus is especially useful for sorting banknotes according to their bank of origin or their denomination, by recognizing the patterns printed on their surfaces. The apparatus may also be used for detecting the orientation of certain banknotes, and for determining which of the two faces is uppermost.

Apparatus according to the invention for scanning a sheet comprises: means for illuminating the sheet; scanning means for collecting light from illuminated pixels of a pattern on the sheet; means for moving the sheet relative to the scanning means; an analogue-to-digital converter responsive to signals from the scanning means representative of the intensity of light from each pixel, to produce intensity signals in digital form; digital correlator means for correlating the digital signals corresponding to the pattern on the sheet, pixel by pixel, with each of a number of previously stored sets of signals, each previously stored set of signals being representative of a different standard pattern, the correlating means generating a correlation output signal for each correlation of the pattern on the sheet with a standard pattern; and sorting means, responsive to the correlation output signals, for diverting the sheet to a destination corresponding to a standard pattern only if the corresponding correlation output signal is higher than the correlation output signals for all other standard patterns.

Preferably, the sorting means diverts the sheet to the destination corresponding to a standard pattern only if the difference between the correlation output signal for that pattern and the next highest value of the correlation output signals for the other patterns is greater than a predetermined threshold. The sheet might, however, still be rejected if the highest correlation output signal itself was lower than a predetermined threshold. The sheet might be recognizable but still be too old or too dirty to be accepted. In one form, a first stored standard pattern represents a pattern on one side of a sheet and a second stored standard pattern represents a pattern on the other side of the same sheet, the apparatus further including means for turning the sheet over if the correlation output signal for the second stored standard pattern is greater than that for the first stored standard pattern.

In the preferred form of the invention, the scanning means comprises a regular array of photodetectors spaced in a direction perpendicular to the direction of motion of the sheet relative to the scanning means. The apparatus preferably includes channel gain correction means which apply correction to the signals from one or more of the photodetectors so as to ensure a uniform response across the said regular array.

The level of each signal may be varied logarithmically with the corresponding level of the signal from the scanning means, to expand the scale and therefore increase the contrast for low levels of the scanning signals.

Figure 2:
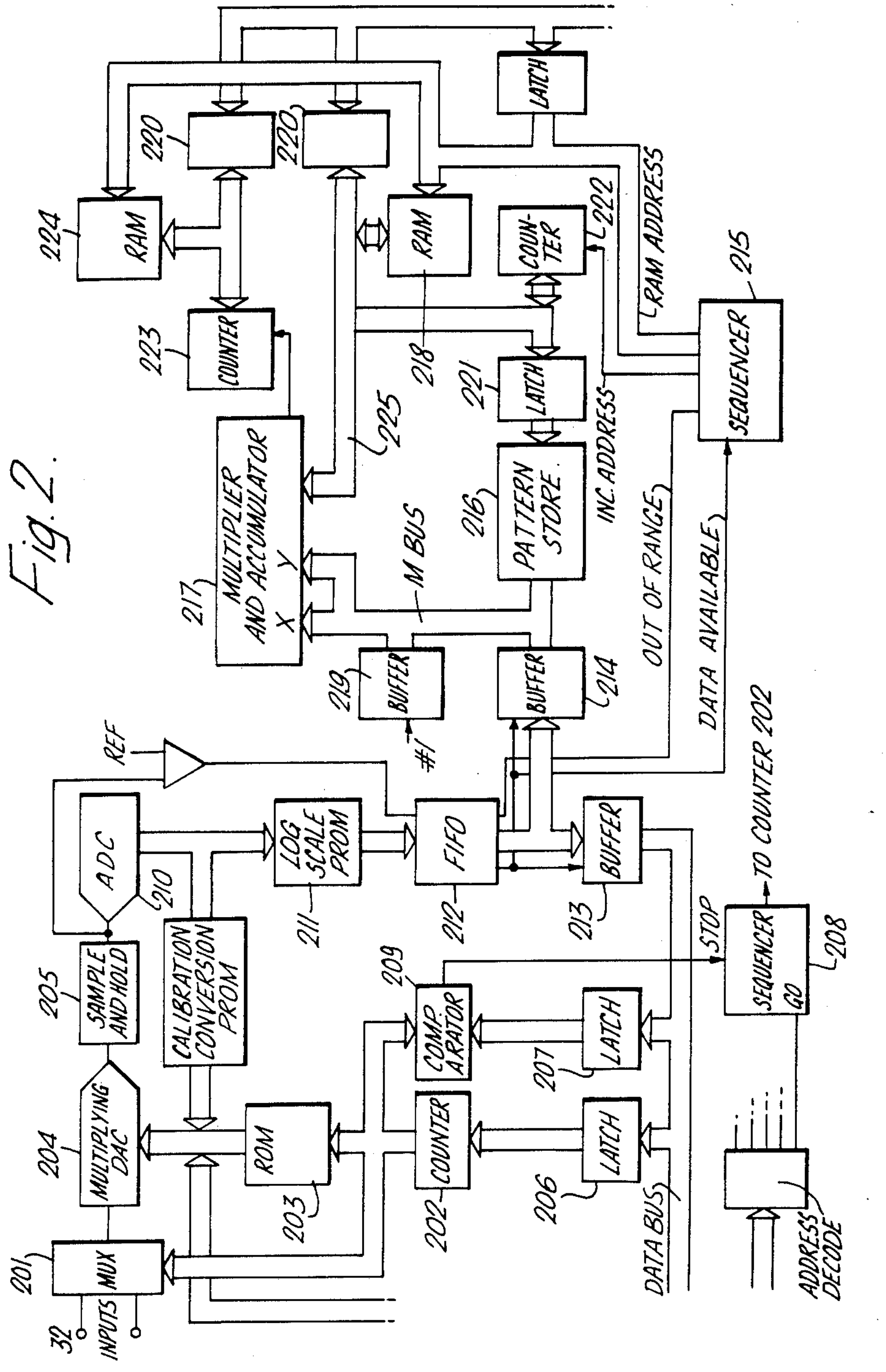

In order that the invention may be better understood, a preferred embodiment of the invention will now be described with reference to the accompanying drawings, wherein:

FIG. 1 shows a perspective view of a banknote being scanned by a linear array of photodetectors, and a block diagram of the remainder of the apparatus for sorting the banknote; and FIG. 2 is a block diagram in detail of part of the apparatus of FIG. 1.

FIG. 1 shows a banknote B which is moved in its own plane width-wise through the light path between a source of illumination S and a linear array of photodetectors 1. The direction of motion of the banknote B is indicated by the arrow A in FIG. 1. In this example, the banknote is scanned by transmission of light, by means of a strip source of illumination S, the source and the array of photodetectors being disposed on opposite sides of the banknote. The source of illumination could alternatively be on the same side as the photodetector array, the photodetectors then responding to light reflected from one surface of the banknote. The array of photodetectors 1 collects light at a line of adjacent points on one side of the banknote and conveys intensity signals through a corresponding number of channels to a multiplexer 3. Measurements are made by the photodetectors at regular intervals as the document is moved past the sensor head. In this way the document, or banknote, is divided into small areas or pixels, on each of which a measurement of the translucency is made.

The analogue intensity signals, in addition to providing information on the translucency of the banknote, indicate the presence and position of the banknote relative to the detectors. When the leading edge of the banknote first crosses the light path between the source and the photodetector array, a note presence and position detector 2 responds to the sensor signals to provide an indication of the presence of the banknote to the controlling microcomputer 4. The microcomputer 4 controls the multiplexer 3 which provides analogue intensity signals at the correct times to an analogue-to-digital converter and logarithmic law encoder 6, via a channel gain correction unit 5. The microcomputer 4 selects in turn each channel covered by the document. In the example shown in FIG. 1, there are 32 channels, each corresponding to one photodetector of the array 1. The output from the multiplexer 3 consists therefore of a sequence of 32 intensity scanning signals, followed by further sequences of 32 signals corresponding to successive lengthwise strips of the banknote. The sensor head is wider than the banknote, so that the position of the banknote can be ascertained and corrected by the microcomputer 4 in response to the signal from the note presence and position detector 2.

The channel gain correction unit 5 applies a correction factor to each output of the sensor head, the correction having being determined by placing a sheet of material of uniform light transmittance across the sensor head. During this calibration of the channel gain correction unit using a uniform sheet of material, the factor by which each signal must be multiplied to achieve a standard voltage from each channel is stored in the unit. These factors are then subsequently used to correct the intensity signals during the scanning of banknotes, and they ensure a uniform response in each of the channels of the photodetectors.

The signal from each sensor is converted into digital form in the analogue-to-digital converter and logarithmic law encoder unit 6. The level of the digital signal produced by the unit 6 varies with the analogue level of the corresponding signal from the channel gain correction unit 5, in accordance with a logarithmic law. The purpose of this logarithmic variation is to correct for soiled documents; as the document or banknote becomes dirty, the average signal level drops, and the contrast decreases. By encoding in accordance with a logarithmic law, the scale is expanded at these low levels and the system is more sensitive.

The digital signals from the analogue-to-digital converter and logarithmic law encoder unit 6 are stored in the form of a 32 digit word in a first-in, first-out buffer 7. Each successive 32-bit word corresponds to a lengthwise scanned strip of the banknote. Successive words are stored in the buffer 7, from which they are fed on the basis of first in, first out. At least one reference pattern has previously been stored in a memory unit 9 which contains pixel data in a form compatible with the incoming data from the buffer 7. During the programming of the memory 9, by scanning standard banknotes for example, a pattern recording control unit 75 controls the storing of words from the first-in, first-out buffer 7 in the reference pattern store 9.

The scanned pattern is then correlated pixel by pixel with each stored pattern in the memory unit 9. Digital intensity signals representing the currently-scanned pattern are designated x, digital intensity signals from the memory are designated y. A multiplying and adding unit 8 responds to successive digital signals from the first-in, first-out buffer 7 and the reference pattern store 9, under the sequencing control of the pattern recording control unit 75. This unit computes all the sums and products of x and y required to derive a correlation output signal P, as defined below. Intermediate results of the correlation operation are stored in a random access memory unit 10, which in turn supplies the intermediate results to the controlling microcomputer unit 4. When the end of the banknote is detected by the note presence and position detector unit 2, the random access memory unit 10 contains the totals of the sums of products, and these are then combined in the final equation by the microcomputer unit 4.

The linear correlation formula for deriving the correlation signal P is as follows:

$$P = \frac{m\Sigma x_i y_i - \Sigma x_i \Sigma y_i}{\sqrt{[m\Sigma x_i^2 - (\Sigma x_i)^2]\,[m\Sigma y_i^2 - (\Sigma y_i)^2]}}$$

where:

m is the number of pixels in the pattern, $y_i$ is the $i^{th}$ pixel of the reference pattern, $x_i$ is the $i^{th}$ pixel of the target pattern.

The formula yields a correlation factor $-1<P<1$ for each reference pattern. The pattern corresponding to the highest value of P represents the most likely match with the target note.

Other formulae may be used for deriving the said correlation output signal, but, however it is derived, the correlation output signal is preferably compared with a predetermined threshold signal, the result of the comparison causing the sheet to be either rejected or accepted.

The apparatus further includes sorting means 11 responsive to the correlation output signal P for each comparison between a pattern on the currently-scanned banknote and the stored reference patterns. The banknote sorter steers or diverts the banknote to a destination in accordance with whichever comparison produced the highest correlation output signal P. If, however, the difference between the highest correlation output and the next highest correlation output is lower than a predetermined threshold value, then it is assumed that the banknote is not reliably matched with any pattern, and should be rejected. The banknote will also be rejected if none of the correlation output signals is above a predetermined threshold level. This means that the banknote is too old or too dirty.

The apparatus of FIG. 1 will now be described in greater detail with reference to FIG. 2. Electronic signals from the 32 heads are passed as inputs to an analogue multiplexer 201. The addressing of the individual input channels is controlled by a counter 202 which simultaneously addresses a read-only memory unit 203. This ROM contains a previously-determined set of correction factors applicable to respective input channels, the correction factors controlling a multiplying digital-to analogue converter unit 204. Thus as each channel is selected in turn, the voltage level reaching a sample-and-hold circuit 205 is automatically corrected for channel matching errors.

During the normal operation of the circuit, a controlling microcomputer 4 (FIG. 1) determines the presence and position of a banknote independently of this circuit, calculates which of the input channels are to be included for a particular pattern comparison, and writes the start channel number into a latch 206 and the end channel number into another latch 207. The microcomputer then enables a hardware sequencer 208 which controls the digitizing of each channel and increments the counter 202. The hardware sequencer 208 runs until a digital comparator 209 indicates that the end channel has been reached.

The two latches 206 and 207, the counter 202 and the comparator 209 fulfill the function of the note presence and position detector 2 of FIG. 1. The read only memory 203 constitutes the channel gain correction unit 5 of FIG. 1.

Each channel addressed by the multiplexer 201 is sampled by the sample-and-hold unit 205, and digitized by an analogue-to-digital converter 210. The digital output level of the analogue-to-digital converter 210 is converted into a new digital level in accordance with a logarithmic function, by means of a logarithmic programmable read-only memory unit 211. The logarithmic digital output of this PROM 211 is stored in a first-in,first-out buffer 212. The FIFO output consists of 32-bit word, and may be read by the microcomputer via a buffer unit 213 for pattern recording purposes, or else passed to a second buffer 214 for pattern correlation. The right-hand side of the diagram in FIG. 2 represents the correlation circuit board, which includes the second buffer 214.

Pixel data from the data acquisition board, which consists of units to the left of the second buffer 214 in FIG. 2, is buffered onto a multiplicand bus (M bus) via the second buffer 214, which is a tri-state device. A "data available" signal from the first-in, first-out buffer 212 is passed to a sequencer 215 which runs while this signal is true. The sequencer 215 controls all tri-state devices on the M bus and diverts such signals to either the X or the Y register of a multiplier circuit 217. This circuit 217 calculates the square of each pixel value and the product of the value with its corresponding pixel in each reference pattern taken from a pattern store 216. The pattern store 216 contains pixel data previously stored during data acquisition mode from the tri-state buffer 213. Each product generated by the multiplier circuits 217 is added to a previous partial sum taken from a random access memory unit 218, via a product-/address bus 225. It will be seen from the above formula for the correlation output signal P that the sum of each pixel is also required. For this reason, a multiplicand of unity is supplied by a tri-state buffer 219.

Partial sums in the random access memory 218 are initialized before the passage of each banknote, by the microcomputer. The complete sums are read back at the end of the processing via bus transceivers 220. Also written into the RAM 218 are the start addresses in the pattern store 216 of each reference pattern. These addresses are transferred in turn to a latch 221, and are simultaneously transferred to a counter 222 which increments the address and allows the new value to be rewritten into the RAM 218. Thus each pixel in each pattern is addressed sequentially. The total sums of products, in some circumstances, may exceed the 16-bit capacity of the multiplier (and accumulator) unit 217. Therefore a counter 223 is incremented each time the accumulator 217 overflows, and this value is stored with the partial sum in a RAM extension unit 224. This allows for values of up to 24-bit precision.

Although this invention has been described in the context principally of banknotes, it may be used for any sheet which contains a pattern, for example any document or cheque. The pattern may be printed on the surface of the sheet, or it may be for example a watermark. The source of illumination S would normally produce light in the visible wavelengths, but if, for example, the pattern of watermarks is to be detected and compared with a reference watermark pattern, then it would be preferable to use ultra-violet light. Suitable filters may be interposed in the light path between the source and the photodetector array, to enhance the response of the system.

In another arrangement of photodetectors a diagonal array is used, with some overlap between adjacent detectors. Fiber optics may be used to convey light to and from the banknote.

The standard patterns previously stored in the apparatus may correspond to banknotes of various denominations and banks of origin; they may also correspond to the two possible orientations of a banknote, and/or the two possible faces which may be uppermost. A reflectance technique is to be preferred to transmission if it is desired to distinguish which face of the banknote is facing the detectors. The results of the correlation comparison may then activate a turn-over mechanism 12 used to turn over those banknotes which have a better correlation with the stored reverse face pattern, as indicated in dotted lines in FIG. 1.

It will be seen that the present invention does not require an exact match between the pattern on the examined note and the reference pattern. The pixels signals derived from the examined note may have more than two values; various values in a grey scale (or a color component scale for colour pattern correlation) may be represented. The correlation technique enables the closeness of the match to be estimated.

It is not essential to scan the whole of the pattern on a note; an area or areas may be selected for scanning and correlation with the stored pattern for that area or areas.

We claim:

1. Apparatus for scanning a sheet comprising:
- means for illuminating the sheets;
- scanning means for collecting light from illuminated pixels of a pattern on the sheet;
- means for moving the sheet relative to the scanning means;
- an analogue-to-digital converter responsive to signals from the scanning means representative of the intensity of light from each pixel, to produce intensity signals in digital form;
- means for storing a plurality of sets of signals, each stored set of signals being representative of a different standard pattern;
- ditital correlator means for correlating the digital signals corresponding to the pattern on the sheet, pixel by pixel, with each of the stored sets of standard-pattern signals, the correlating means generating, for each correlation of the patttern on the sheet with a standard pattern, a correlation output signal, where:

$$\frac{m\Sigma x_i y_i - \Sigma x_i \Sigma y_i}{\sqrt{[m\Sigma x_i^2 - (\Sigma x_i)^2]\,[m\Sigma y_i^2 - (\Sigma y_i)^2]}}$$

and in which:
- m is the total number of pixels of the patterns; i takes all values between 1 and m,
- $Y_i$ is the $i^{th}$ pixel of the standard, previously-stored pattern, and
- $x_i$ is the $i^{th}$ pixel of the pattern on the sheet, and;
- sorting means, responsive to the correlation output signals, for diverting the sheet to a destination corresponding to a standard pattern only if the corresponding correlation output signal is higher than the correlation output signals for all other standard patterns.

2. Apparatus in accordance with claim 1, wherein the sorting means diverts the sheet to the destination corresponding to a standard pattern only if the difference between the correlation output signal for that pattern and the next highest value of the correlation output signals for the other patterns is greater than a predetermined threshold.

3. Apparatus in accordance with claim 1 in which a first stored standard pattern represents a pattern on one side of a sheet and a second stored standard pattern represents a pattern on the other side of the same sheet, the apparatus further including means for turning the sheet over if the correlation output signal for the second stored standard pattern is greater than that for the first stored standard pattern.

4. Apparatus in accordance with claim 3 including means responsive to a detector sensing the leading edge of a sheet for initiating the operation of the digital correlator means.

* * * * *